Nov. 12, 1957 S. I. CORY 2,813,149

TELEGRAPH TRANSMISSION ERROR REGISTER

Filed April 19, 1954

INVENTOR
S. I. CORY
BY John E. Cassidy
ATTORNEY

United States Patent Office 2,813,149

Patented Nov. 12, 1957

2,813,149

TELEGRAPH TRANSMISSION ERROR REGISTER

Samuel I. Cory, Towaco, N. J., assignor to Bell Telephone Laboratories, Incorporated, New York, N. Y., a corporation of New York Application April 19, 1954, Serial No. 423,928

7 Claims. (Cl. 178—23)

This invention relates to equipment for detecting errors in electrical signals. More particularly this invention relates to detecting errors in received permutation code signal combinations in telegraph signaling, for instance, in transmission over metallic circuits connecting two points as well as in transmission over radio channels. As is well known the signaling conditions defining one or more of the elements of a transmitted combination may be changed during transmission by inductive interference from neighboring circuits or by the effect of static or other discharges, for instance, so that a signal combination received defines a different character or function from that transmitted and an error is recorded.

It is desirable to know when conditions, which adversely affect signal reception, prevail and also to have some measure of the amount of interference to be expected on circuits connecting particular points. There are presently known in the art a number of arrangements for affording this information. There is need, however, for an accurate and relatively inexpensive device which performs this function and the present invention is designed to fill this need.

An object of the invention is the improvement of error detecting circuits for use in detecting errors in the reception of multielement signal combinations defining characters and functions, for instance.

A more particular object of the invention is to afford a relatively simple, economical and reliable circuit for detecting errors in multielement signal combinations.

A feature of the invention is an arrangement having a number of sets of space discharge devices corresponding to the number of signal conditions of which the signaling code employed consists and the production of a characteristic voltage, which is normal or abnormal, dependent upon the reception of normal or abnormal signal elements by each of the sets and thereafter the combining of these voltages to produce a single normal or abnormal voltage to indicate the reception of a normal or abnormal signal combination.

This feature and other features of the invention may be understood from the following description when read with reference to the associated drawing which taken together disclose a preferred embodiment in which the invention is presently incorporated. It is to be understood, however, that the invention is not limited to incorporation in the present embodiment but may be employed in other forms which will be readily suggested to those skilled in the art by the description hereinafter.

Figures 1, 2:
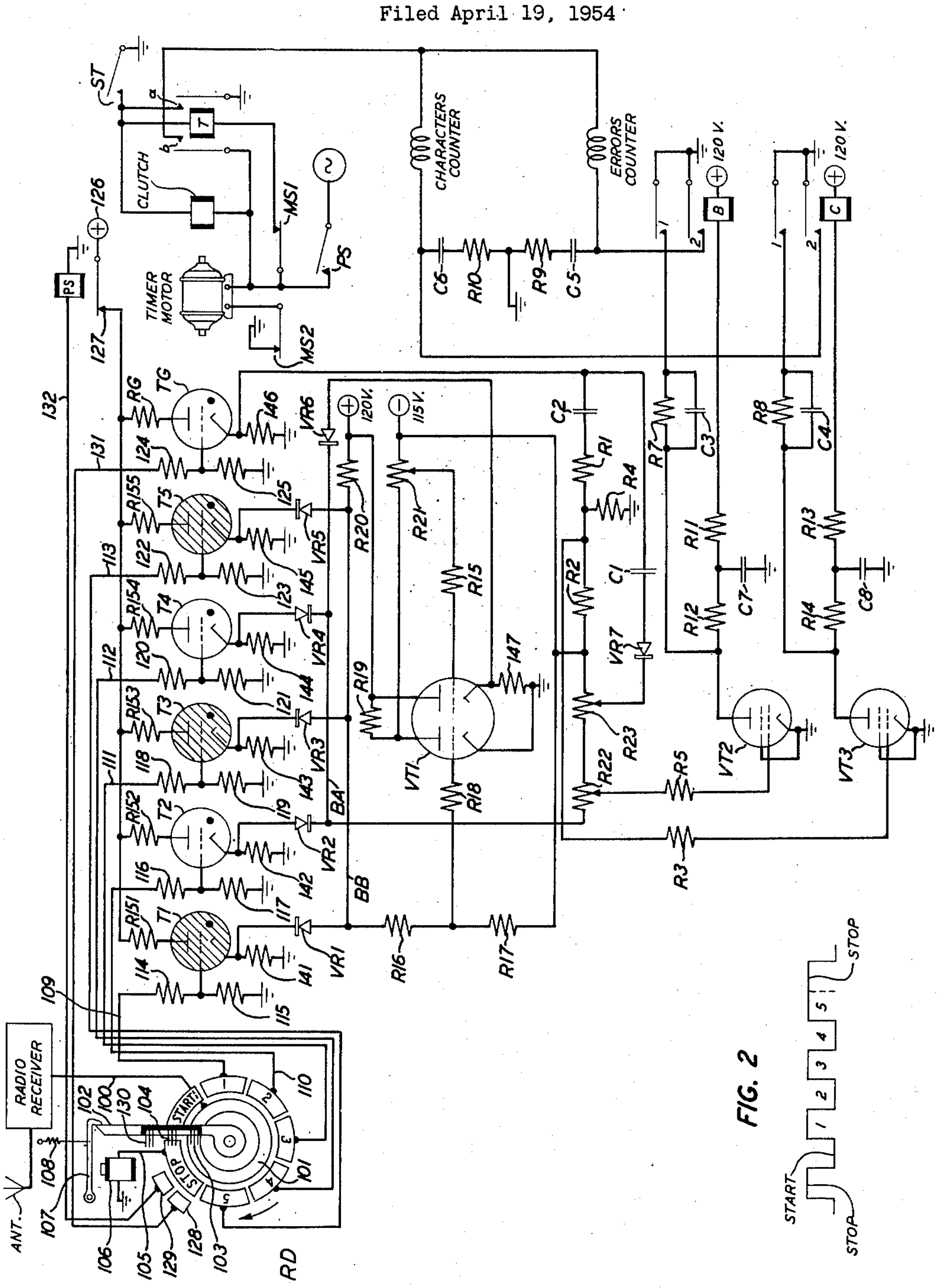
Fig. 1 shows the arrangement of the circuit of the present invention.
Fig. 2 is a diagram of a signal train used in explaining the invention.

Refer now to Fig. 1.

The invention is illustrated in Fig. 1 as applied to a radio receiver. The signals are received by the antenna ANT and applied to the radio receiver indicated by a captioned rectangle where they are detected and amplified in a well-known manner and impressed through conductor 100 on solid continuous conducting ring 101 of a rotary distributor RD well known in the art. It is to be understood that the invention is not limited to use in a radio system but may be employed in connection with any receiver of signal combinations in which the characters or functions are defined by means of signal elements having a plurality of conditions. Further, it is to be understood that the rotary distributor shown in Fig. 1 may be replaced with an electronic distributor. And, in general, the present error detecting circuit is intended for general application with many kinds of signaling systems and may be controlled in any of a number of manners different from the radio receiver and rotary distributor illustrated in Fig. 1.

It is to be understood further that the signal code, which may be employed, may be any of a large number of signal codes. For purpose of illustration it will be assumed that the error detector is presently employed in detecting errors in signal combinations according to a multielement permutation code in which any of the signal elements comprising the combination may be of either of two signaling conditions. As will appear from the description hereunder, codes other than multielement permutation codes and signaling elements having more than two conditions may be employed.

In the use of the embodiment of Fig. 1 of the present invention it is contemplated that a multielement permutation code signal train comprising five character or function determining elements, a start element and a stop element will be transmitted from the distant station. Each of the five character or function determining elements may be of either of two conditions. These conditions in the present instance may be a current condition and a no-current condition. The start element, which precedes each character or function determining train, is always a no-current element. The stop element, which succeeds each character or function determining train, is always a current signal element. As the circuit is presently arranged it is contemplated that some one particular code combination, defining a particular character or function determining combination, will be transmitted from the transmitting station a large number of times successively for a measured interval. The interval may be of a duration of 5 minutes to 30 minutes, for instance, or more or less. The present error detecting mechanism tests each incoming signal to determine whether the elements, corresponding to the character or function determining combination, conform to those transmitted from the distant station. The present circuit includes means for counting the number of character combinations received during the timed testing interval and also means for counting the number of signal combinations which are in error.

Refer now to Fig. 2.

Experience has shown that the quality of the transmitting medium, that is to say, its tendency to affect the transmitted signal elements in a manner to produce errors in all transmitted signal combinations, may be reasonably indicated by its effect on the signal elements of a representative permutation code combination, for instance, the combination corresponding to the letter Y. The five permutation code signal elements defining the letter Y in the present code are as represented in Fig. 2 and, as may be observed from reference to this figure, consist in a series of reversals. In Fig. 2 the character determining elements which define the letter Y are indicated by the numerals 1, 2, 3, 4 and 5. Elements 1, 3 and 5 are current signal elements. Elements 2 and 4 are no-current signal elements. It will be observed that the start element is a no-current signal element and the stop element is a current signal element.

Refer now to Fig. 1.

In the following description, it is to be understood, that the values of the constants cited are by way of example.

In response to the transmission of successive trains of permutation code signal elements each defining the letter Y, a succession of trains of signal elements, corresponding to that shown in Fig. 2, should be received by the antenna and impressed through the radio receiver and conductor 100 on ring 101. The rotatable arm 102 of the rotary distributor RD is coupled through a friction clutch to a continuously rotating motor, both not shown. When the arm is in the stop position, a current signal impulse is impressed on ring 101 and through the interconnected brushes 103 and 104 on the stop segment of the segmented outer ring of the rotary distributor RD. This ring comprises seven segments, one for each element of the code. The segments are insulated one from another. From the stop segment a circuit may be traced through conductor 105 and the winding of magnet 106 to ground energizing the magnet which attracts stop arm 107, the right end of which projects downwardly to form an obstruction in the path of the rotatable arm 102, so that the arm 102 is normally arrested, once per revolution, in a position near the right-hand end of the stop segment. In response to the start signal element of a train, which is always a no-current signal element, current supplied through conductor 100 will cease. Magnet 106 will be deenergized and stop arm 107 will be elevated under the influence of spring 108 to permit rotatable arm 102 to rotate. As the brush 104 sweeps across each one of segments 1 to 5, current or no-current signal elements, which should correspond to those shown in the correspondingly numbered positions in Fig. 2, will be impressed through conductors 109 to 113 and resistors 114 and 115 to 122 and 123 to ground if the received signal combination is correct. The grids of tubes T1 to T5 are connected to the junctions between resistors 114 and 115 to 122 and 123, respectively. The current signal elements, which are impressed through segments 1, 3 and 5, will cause gas-filled triodes T1, T3 and T5 to become activated. The no-current signal elements impressed on segments 2 and 4 will prevent the activation of gas-filled triodes T2 and T4. It will be observed that positive battery 126 is connected through contact 127 of plate supply relay PS and resistors R151 to R155 and RG, respectively, to the anodes of tubes T1 to T5 and TG, respectively. When the rotatable arm sweeps off segment 5 and onto the stop segment of the rotary distributor, tubes T1, T3 and T5 will remain activated and tubes T2 and T4 will remain inactivated. The rotatable arm 102 of the rotary distributor is equipped with a conducting brush 130 which engages successively with conducting segments 128 and 129 before the arm 102 is arrested in its stop position. Brush 130 is also connected to ring 101. It will be recalled, and reference to Fig. 2 shows, that the stop signal element of every signal train is a current signal element. This current is impressed through segment 128 upon its engagement with brush 130 and the circuit is extended through conductor 131 and resistors 124 and 125 to ground. The grid of gas-filled gate tube TG is connected to the junction between resistors 124 and 125 and gate tube TG is activated at this instant.

To anticipate, as rotatable ram 102 continues its rotation, brush 130 engages segment 129 and the current pulse prevailing during the stop interval is impressed through conductor 132 and the winding of the plate supply relay PS to ground, operating relay PS, opening contact 127 and disconnecting battery from all of the tubes deenergizing such of them as are activated before the start of a new cycle.

To return now to the condition which prevails prior to the activation of relay PS, when any of the tubes T1 to T5 is activated, a circuit is established from battery 126 through contact 127 and an individual resistor of the group of resistors R151 to R155 to the anode of the tube, across the space within the tube, between the anode and the cathode of the tube and through an individual resistor connected to the cathode of the tube, which may be any of resistors 141 to 146, to ground. When a tube is inactivated the potential of its cathode is zero volts with respect to ground. When a tube is activated the potential of its cathode is positive 60 volts with respect to ground. Each one of the cathodes of tubes T1 to T5, associated with the character determining elements, is connected through an individual varistor of the group VR1 to VR5 to either one of two bus bars BA or BB. The cathodes of tubes which are normally inactivated will be connected to bus bar BA, thus the cathodes of tubes T2 and T4 will be connected through varistors VR2 and VR4, respectively, to bus bar BA. The cathodes of tubes which are normally activated will be conected through individual varistors to bus bar BB, thus the cathodes of tubes T1, T3 and T5 will be connected through varistors VR1, VR3 and VR5 to bus bar BB. Varistors VR2 and VR4 are poled so that they present relatively low resistance when their upper terminals are positive with respect to their lower terminals. Varistors VR1, VR3 and VR5 are poled oppositely from varistors VR2 and VR4, so that they present relatively low resistance when their lower terminals are positive with respect to their upper terminals. Accordingly, if the signal elements are normal and tubes T2 and T4 are consequently inactivated, bus bar BA, which connects through varistor VR6 and resistor 147 to ground, will be at zero volts potential, since the right-hand triode of double triode VT1 is momentarily inactivated, for reasons to be made clear hereinafter. Bus bar BB is conected through resistor R20 to a grounded source of positive 120-volt potential. Resistor R20 in this circuit is of relatively very large magnitude and each of resistors 141, 143 and 145 is of relatively low magnitude. Bus bar BB is connected also through resistor R16, resistor R17, resistor R2 and resistor R4 to ground. The grid of the left-hand triode of tube VT1 is connected through resistor R18 to the junction of resistors R16 and R17. When the potential of bus bar BB is positive 60 volts for the normal condition, the left-hand triode of tube VT1 is activated. Potential is supplied to the anode of the left-hand triode of tube VT1 through a potentiometer circuit comprising a source of grounded positive 120-volt potential, resistor R19 and potentiometer R21 to a source of grounded negative 115-volt potential. In response to the activation of the left-hand triode of tube VT1 the potential of its anode will become less positive. This anode is connected through the left-hand portion and movable arm of potentiometer R21 and resistor R15 to the grid of the right-hand triode of tube VT1. The grid of the right-hand triode will be made sufficiently negative so that the right-hand triode is inactivated. For this condition, therefore, the cathode of the right-hand triode of tube VT1 is at ground potential as mentioned heretofore.

It will be assumed now that the first signal element of the character or function determining train, signal element 1, is incorrectly received as a no-current signal element. Tube T1 will, therefore, be inactivated. In the circuit traceable from grounded positive 120 volts through resistor R20, varistor VR1 and resistor 141 to ground, since the magnitude of resistor R20 is, for instance, one and one-half megohms and the magnitude of resistor 141 is 1,000 ohms, for instance, the potential of bus bar BB will be substantially at zero volts. In response to this, the left-hand triode of tube VT1 will be cut off, raising the potential of its anode which is applied, as described, to the grid of the right-hand triode of tube VT1, activating the right-hand triode. In response to this, the potential of the cathode of the right-hand triode of tube VT1 becomes positive 60 volts. The polarity of varistor VR6 is such that the potential of bus bar BA becomes positive 60 volts. The change from the normal zero volt potential indicates the reception of an abnormal signal train of character or function determining elements. If any one of elements 3 or 5, rather than element 1, becomes a no-current signal element, as received, the result will be the same, and if two or all three elements T1, T3 and T5 are changed to no-current signal elements the result will also be substantially the same.

It will now be assumed that signal element 2 is changed to a current signal element in the course of transmission. As a result of this, tube T2 will be activated, raising the potential of its cathode to positive 60 volts which will be impressed through varistor VR2 to bus bar BA so that the potential of bus bar BA will become positive 60 volts. Assuming that the cathode of the right-hand triode of tube VT1 at this time is essentially at ground potential, which is the normal condition, varistor VR6 isolates bus bar BA, due to the polarity of varistor VR6. If due to the reception of one or more abnormal signal elements, by tubes T1, T3 and T5, the cathode of the right-hand triode of tube VT1, for reasons explained, is raised to its higher positive potential, bus bar BA will be maintained at substantially positive 60 volts. From this it should be apparent that if any one of the signal elements of the character or function determining signal train is abnormal the potential of bus bar BA will be changed from its normal zero volts to positive 60 volts. Bus bar BA is connected through potentiometer R22, potentiometer R23, resistor R2 and resistor R4 to ground. The grounded negative 115-volt source is connected to the junction between resistor R2 and potentiometer R23. Tube TG serves as a trigger tube. When it is activated, a positive potential pulse is applied through condenser C1 and varistor VR7 to potentiometer R23, which is in the circuit traced from bus bar BA, so that the potential of the pulse supplied from the cathode of trigger tube TG and the potential supplied from bus bar BA are combined. Condenser C2 and resistor R1 are employed to improve the form of the pulse from tube TG. The grid of tube VT2 is connected through resistor R5 to potentiometer R22. If the potential of bus bar BA is normal for the reception of a normal character train, the pulse supplied from the gating tube TG when combined with the normal zero potential of bus bar BA will have no effect on tube VT2. If, however, the potential of bus bar BA is positive 60 volts, for instance, due to the reception of an abnormal signal train, the tube VT2 will be activated. The output circuit for tube VT2 may be traced from a grounded source of positive 120 volts through the winding of relay B, resistor R11, resistor R12, anode of tube VT2 and across the space within the tube to the grounded cathode thereof energizing relay B. Condenser C7 is connected to the junction between resistors R11 and R12 in the circuit just traced. The purpose of this is to slow up the response of relay B to ensure the operation of the errors counter. Relay B will be actuated once for every abnormal character forming train received. A circuit may be traced from the junction of resistors R2 and R4 through resistor R3 to the grid of tube VT3. Each time a pulse is received from gating tube TG the potential applied to the grid of tube VT3 will cause it to be activated. The output circuit may be traced from a grounded source of positive 120-volt battery through the winding of relay C, resistor R13, resistor R14, anode of tube VT3 and across the space within tube VT3, between its anode and cathode, to ground operating relay C. Each time relay B or relay C operates it closes a path to inactivate tube VT2 and tube VT3, respectively. For tube VT2 this path extends from ground through contact 1 of relay B and resistor R7 in parallel with capacitance C3 to the anode of tube VT2. This connection also acts to hold contact 2 of relay B closed momentarily to ensure the operation of the errors counter. In the case of tube VT3 a corresponding circuit may be traced from ground through contact 1 of relay C and resistor R8 in parallel with condenser C4 to the anode of tube VT3, which performs corresponding functions, that is, it inactivates tube VT3 and holds contact 2 of relay C closed for an interval long enough to ensure the operation of the characters counter. Condenser C8 is connected to the junction of resistors R13 and R14 to slow up relay C to ensure the operation of the characters counter. Relay C will be actuated once for the reception of each character forming train.

The present circuit is equipped with a timer which controls the circuit for any desired predetermined interval, throughout a range, during which the number of errors received may be counted and compared with the total number of characters received during the same interval.

Any timing device which is arranged to measure a predetermined interval of sufficient duration and to supply potential during that interval to the characters and errors counters would be satisfactory for the present purpose. For purpose of illustration the timer represented by its conventional circuit is the model PAB–30M timer manufactured by the Industrial Timer Corporation, Newark, New Jersey, U. S. A. This is a so-called instantaneous reset timer having the characteristic that it can be set to measure an interval, at the termination at which interval it will automatically reset. To operate the timer, power switch PS and the start switch ST are both closed. Switches MS2 and MS1 are also closed as indicated. Power is then supplied to the power motor from an alternating-current source through switch PS, windings of the motor and switch MS2 to ground. A circuit is also established from the alternating-current power source through switch PS, contact MS1, winding of relay T and the contacts of start switch ST to ground, operating relay T which locks through its front contact *a*. The operation of relay T also establishes a circuit from the alternating-current power source, through power switch PS, and contact *b* of relay T to the right-hand terminal of the windings of the characters counter and the errors counter in parallel. This power source will remain connected for an interval measured by the timer, at the end of which the timer clutch will be released, opening the contacts MS1 and MS2 to release relay T and to disconnect power from the motor. The release of relay T will disconnect the power source from the characters and errors counters.

Relay B controls the counter which counts the errors and relay C controls the counter which counts the number of characters. While the times is in operation contact *b* of relay T will be closed and power from the power source will be connected through switch PS and contact *b* of relay T to the right-hand terminals of the characters counter and errors counter in parallel. As each character combination is received the circuit will be extended through the winding of the characters counter and contact 2 of relay C to ground activating the counting mechanism of the characters counter. As each error is received the circuit will be extended through the winding of the errors counter and contact 2 of relay B to ground activating the counting mechanism of the errors counter. Any of a number of well-known electromagnetic counters may be employed to perform the counting funtcion. Condenser C5 and resistor R9 and condenser C6 and resistor R10, which shunt contact 2 of relay B and contact 2 of relay C, respectively, are employed to protect these contacts. The total number of characters which have been received and the total number of errors which have occurred during the measured interval will be recorded as described in the foregoing.

What is claimed is:

1. An error register for multielment, two-condition, telegraph signal combinations comprsing a space discharge device for each of said elements, an individual non-linear polarity discriminating resistor connected to the output of each of said devices, said devices and resistors connected into two groups, one group for each of said conditions, the resistors in one of said groups poled oppositely from the resistors in the other of said groups, and a potential inverter for changing the potential produced by one of said groups so as to substantially match the potential produced by the other of said groups when all of the elements in a combination are normal.

2. An error register, in accordance with claim 1, having means for producing an abnormal potential in one of said groups in response to the impressing of an abnormal signal element on said one group, and means in said inverter for producing a potential substantially different from that produced in the other of said groups in response to the production of said abnormal potential.

3. An error register, in accordance with claim 1, having means for producing an abnormal potential in either of said groups in response to the impressing of an abnormal signal element on either of said groups.

4. An error register, in accordance with claim 1, having means for producing an abnormal signal potential in either of said groups in response to the reception of an abnormal signal element by either of said groups, means for changing the potential of one or said groups whether the signal elements applied to its be normal or abnormal, means for combining said changed potential with the potential produced in said other group, and means for producing one or another of two characteristic potentials to denote a normal or abnormal signal combination in response to said combining.

5. An error register for checking errors in received multielement two-condition permutation code signals, said register having an individual signal element sensing circuit for each element of a particular predetermined signal combination of said code, each said sensing circuit having an individual space discharge device, each said device having an individual input circut and an indvidual output circuit, an individual cathode resistor having resistance of low magnitude and an individual unidirectional current means connected thereto in each of said output circuits, said output circuits arranged in a first and a second group, one group for each of said conditions of said code, each said unidirectional current means in said first group having its positive terminal connected to a first common connector, each said unidirectional current means in said second group having its negative terminal connected to a second common connector, means for impressing all of the elements of said predetermined combination of a first and a second of said two conditions on said inputs of said devices having outputs interconnected in said first and said second group respectively, a source of potential connected through a resistor of relatively very large magnitude and said first common connector to the input of the first of a pair of discharge devices, the output of the first of said pair of devices connected to the input of the second of said pair of devices, the output of the second of said pair of devices connected to said second common connector, and means responsive to the reception of a normal or abnormal signal combination for producing a normal or abnormal potential respectively on said second common connector as an indication of the condition.

6. An error register for checking errors in multielement two-condition permutation code signal combinations, said combinations having $n$ elements, said register comprising means for testing the elements of a representative one of the combinations of said code, said representative combination having $a$ elements of a first of said two conditions and $b$ elements of a second of said conditions, where $(a+b)$ equals $n$, $n$ signal element sensing circuits divided into a first and a second group, one of said groups having $a$ sensing circuits and the other of said groups having $b$ sensing circuits, a space discharge tube having an input circuit and an output circuit in each of said sensing circuits, an individual unidirectional current device in each of said output circuits, said current devices in said first group connected to a first common termination, said current devices in said second group poled oppositely from said current devices in said first group and connected to a second common termination, means responsive to the impressing of $a$ normal signal elements of said representative combination on said input circuits of said first group for producing a first normal potential P1 on said first termination, means responsive to the impressing of $b$ normal signal elements of said representative combination on said input circuits of said second group for producing a second normal potential P2 on said second termination, a potential changer interconnecting said first and said second termination, means in said changer, responsive to said production of potential P1, for changing said potential P1 to potential P2 and impressing it on said second termination, and means responsive to the impressing of an abnormal signal element on any of said inputs for producing a potential different from potential P2 on said second termination to indicate said abnormal condition.

7. An error register circuit for testing a single predetermined multielement permutation code signal combination having elements of a first or a second condition, said register circuit having an individual sensing circuit for each element of said combination, said sensing circuits separated into a first and a second group, said first and said second groups individual to said first and said second conditions, a space discharge device in each said sensing circuit, said device having an input and an output circuit, an individual unidirectional current device in each said output circuit, said unidirectional current devices in said first group connected to a first common termination, said unidirectional current devices in said second group connected, with polarity opposite from those in said first group, to a second common termination, means responsive to the impressing of the normal signal elements of said predetermined combination on said inputs for producing normal potential on said two terminations, said potentials differing one from another, means responsive to the production of one of said potentials on said first termination for changing said potential to said second potential and impressing said changed potential on said second termination to indicate a normal combination, and means responsive to the impressing of an abnormal signal element of said predetermined combination on any of said inputs for producing an abnormal potential on said second termination.

References Cited in the file of this patent

UNITED STATES PATENTS

| | | |
|---|---|---|
| 2,304,120 | Potts | Dec. 8, 1942 |
| 2,675,538 | Malthaner et al. | Apr. 13, 1954 |
| 2,675,539 | McGuigan | Apr. 13, 1954 |
| 2,688,050 | Harris | Aug. 31, 1954 |